(12) United States Patent
Kemp et al.

(10) Patent No.: US 8,620,466 B2
(45) Date of Patent: Dec. 31, 2013

(54) METHOD FOR DETERMINING A POINT IN TIME WITHIN AN AUDIO SIGNAL

(75) Inventors: Thomas Kemp, Esslingen (DE); Markus Zumkeller, Schwaikheim (DE)

(73) Assignee: Sony Deutschland GmbH, Berlin (DE)

( * ) Notice: Subject to any disclaimer, the term of this patent is extended or adjusted under 35 U.S.C. 154(b) by 926 days.

(21) Appl. No.: 12/526,636

(22) PCT Filed: Nov. 30, 2007

(86) PCT No.: PCT/EP2007/010426
§ 371 (c)(1),
(2), (4) Date: Aug. 11, 2009

(87) PCT Pub. No.: WO2008/119372
PCT Pub. Date: Oct. 9, 2008

(65) Prior Publication Data
US 2010/0040342 A1   Feb. 18, 2010

(30) Foreign Application Priority Data
Mar. 31, 2007   (EP) ..................................... 07006767

(51) Int. Cl.
G06F 17/00   (2006.01)
(52) U.S. Cl.
USPC ......................................................... 700/94
(58) Field of Classification Search
USPC .................. 700/94; 704/500–504; 381/56, 58
See application file for complete search history.

(56) References Cited

U.S. PATENT DOCUMENTS

| | | |
|---|---|---|
| 2002/0120925 A1 | 8/2002 | Logan |
| 2003/0163823 A1 | 8/2003 | Logan |
| 2005/0044561 A1 | 2/2005 | McDonald |
| 2006/0120536 A1 | 6/2006 | Kemp |
| 2006/0239130 A1 | 10/2006 | Momosaki et al. |

FOREIGN PATENT DOCUMENTS

| | | |
|---|---|---|
| EP | 1 667 106 | 6/2006 |
| JP | 2006-108984 A | 4/2006 |
| JP | 2006-309923 | 11/2006 |

OTHER PUBLICATIONS

Office Action issued Sep. 7, 2011, in Chinese Patent Application No. 200780052430.6 (English-language translation only).
Japanese Office Action issued Nov. 22, 2011, in Patent Application No. 2010-501377 (with English-language translation).
Chinese Office Action issued Apr. 23, 2012 in Patent Application No. 200780052430.6 with English Translation.
Office Action issued Mar. 15, 2011 in Chinese Patent Application No. 200780052430.6 (English translation only).
Ribbrock, A. et al., "A Full-Text Retrieval Approach to Content-Based Audio Identification", IEEE, pp. 194-197 (2002).

(Continued)

*Primary Examiner* — Andrew C Flanders
(74) *Attorney, Agent, or Firm* — Oblon, Spivak, McClelland, Maier & Neustadt, L.L.P.

(57) ABSTRACT

A method for determining a point in time within an audio signal, the audio signal having been transmitted from a broadcast station to a client and to a server, the method including: deriving, at the server, first signature data from the audio signal, wherein a reference point in time is associated with the beginning or end of the audio data corresponding to the first signature data; deriving, at the client, second signature data from the audio signal, wherein the second signature data are derived in the same manner as the first signature data at the server; comparing the first and second signature data; and determining the point in time to be equal to the reference point in time depending on a result of the comparing.

31 Claims, 7 Drawing Sheets

(56) References Cited

OTHER PUBLICATIONS

Kurth, F., "A Ranking Technique for Fast Audio Identification", IEEE, pp. 186-189 (2002).

Cano, P. et al., "A Review of Algorithms for Audio Fingerprinting", IEEE, pp. 169-173 (2002).

Office Action issued Jul. 10, 2012 in Japanese Patent Application No. 2010-501377 with English language summary translation.

Office Action issued Jul. 27, 2012 in Chinese Patent Application No. 200780052430.6 with English language translation.

METHOD FOR DETERMINING A POINT IN TIME WITHIN AN AUDIO SIGNAL

The invention relates to a method for determining a point in time within an audio signal and to a recording device.

BACKGROUND OF THE INVENTION

Today recording devices, e.g. digital recording devices with a hard drive or disc drive, exist for recording audio and/or video signals that are broadcast from a broadcast station. After having recorded audio and/or video signals, a user, however, might not be interested in all of the recording. For example, a user might want to cut out advertisements, e.g. commercials, from the recorded audio and/or video signal. Further, the recorded audio and/or video signal may comprise a movie and the user may want to start watching the movie without having to search for the beginning or end of the movie manually.

BRIEF SUMMARY OF THE INVENTION

It is an object of the invention to provide a method for determining a point in time within an audio signal and a recording device e.g. enabling exact navigation of a recorded audio and/or video signal.

This object is solved by a method and recording device according to claims 1, 23, and 28, respectively.

DETAILED DESCRIPTION OF THE INVENTION

Figure 1:
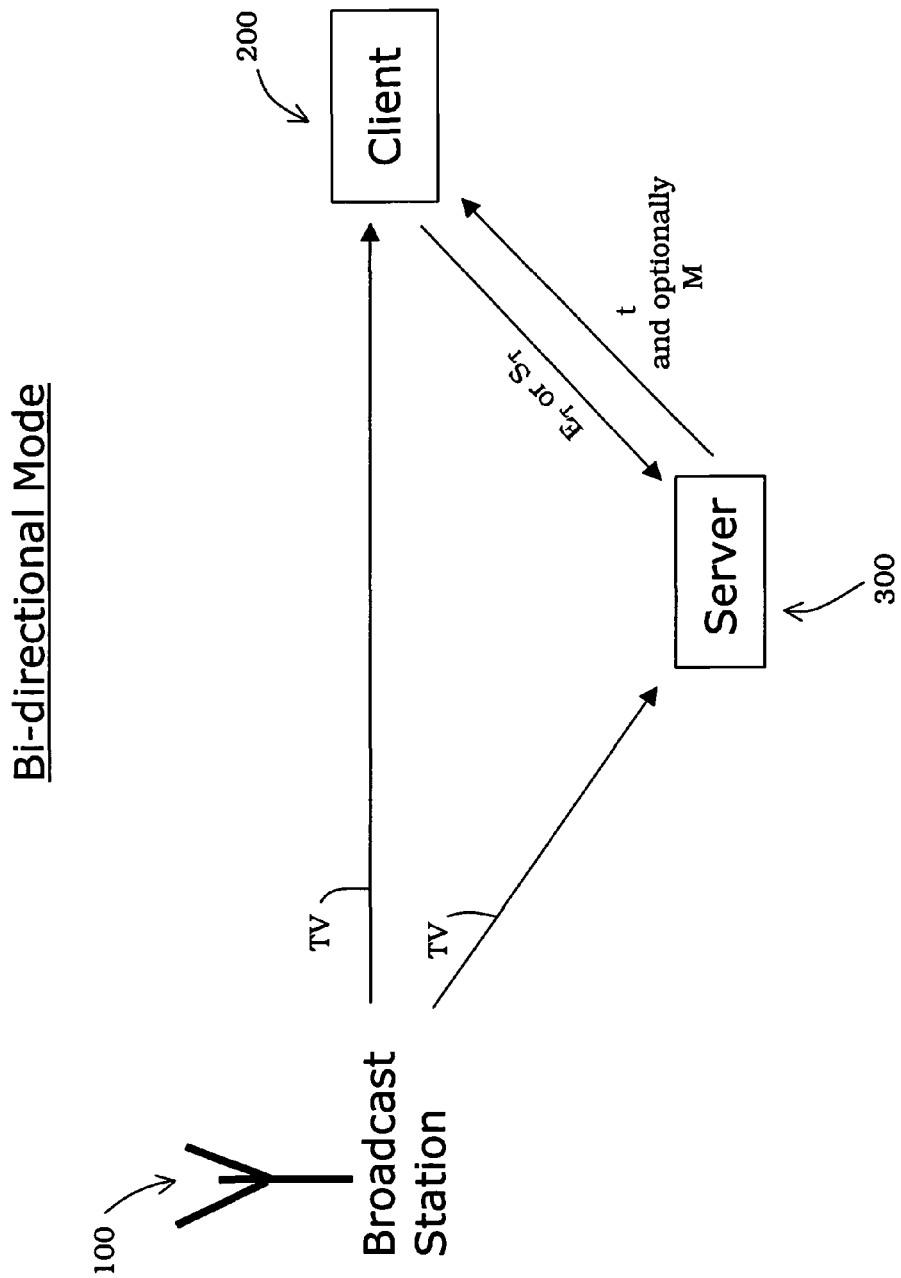
FIG. 1 shows a system overview in case of operation according to bidirectional mode.

In the following, embodiments of the invention are described. It is important to note, that all described embodiments in the following may be combined in any way, i.e. there is no limitation that certain described embodiments may not be combined with others.

According to an embodiment of the invention, a method for determining a point in time within an audio signal, said audio signal having been transmitted from a broadcast station to a client, e.g. a recording device, and to a server comprises: deriving, at the server, first signature data from the audio signal, wherein the first signature data are descriptive of at least one part of said audio signal, and wherein a reference point in time is associated with the beginning or end of said at least one part of said audio signal. The first signature data may be determined according to a predetermined algorithm such as e.g. described in published European Patent Application No. EP 1667106 A1 (=EP Application No. 04 028 88.1).

The method may also comprise deriving, at the client, second signature data from the audio signal, wherein the second signature data are descriptive of at least one part of said audio signal and are derived in the same manner, e.g. according to the same algorithm, as said first signature data at the server. In other words, according to an embodiment of the invention, at the server and at the clients, parts of the received audio signal are analyzed and for at least some of these parts signature data are determined according to the same algorithm. The first and second signature data may be compared and the point in time may be determined to be equal to said reference point in time depending on a result of the comparing step. Thus, for example, first signature data corresponding to a certain part of the audio signal is compared to second signature data. If said first signature data are determined to be similar or same to the second signature data, then it is assumed that the part of the audio signal at the server and the part of the audio signal at the client are the same. Thus, the point in time at the client side is set to the beginning or end time of the part of the audio signal at the server side.

In a further embodiment, said audio signal may be part of a television signal and said method comprises recording, at the client, said television signal. Further, it is possible that program information regarding the recorded television signal is transmitted from said server to said client. For example, the program information may indicate the exact times of the beginning and end of a movie or of advertisement blocks within the television signal. Based on this program information and said point in time, said client may control playback of the recorded television signal such that playback starts exactly at a desired position, e.g. the beginning of the movie and parts of the television signal that the user is not interested in, e.g. advertisements blocks, are cut out. Also, playback may be controlled to end exactly at a desired position.

It should, thus, be noted that the principles described throughout the specification in connection with an audio signal are likewise applicable to an audio/video signal, e.g. a television signal or video data stream, comprising an audio signal or audio data. Any features or details described in this specification may, therefore, be applied to an audio/video signal, television signal, video data stream, audio data stream or the like.

In a further embodiment, operation may be performed according to a bidirectional mode. In bidirectional mode there exists a two way communication channel between the client and the server. According to an embodiment of the bidirectional mode, said second signature data may be sent from the client to the server and the step of comparing may be done at the server. Thus, the computational power of the client may be kept low, because the comparison step that may require high computational power can be done at the server.

According to a further embodiment of the bidirectional mode, said second signature data may correspond to only one selected part of the audio signal. Since the second signature data need only be determined for one selected part of the audio signal, computational burden may further be reduced.

Further, said first signature data may comprise a plurality of subunits, wherein each subunit is derived from a respective part of said audio signal, and wherein, in said step of comparing, a similarity measure may be determined for each subunit, said similarity measure being descriptive of a degree of similarity of a respective subunit and the second signature data, and wherein, in said step of determining, the point in time may be determined to be equal to the reference point in time of the maximum similar subunit, said maximum similar subunit having the highest similarity measure of all subunits.

In other words, the audio signal may be segmented into different segments and for each segment, signature data is determined.

The parts of the audio signal from which the subunits are derived may be selected to comprise non-silent passages of the audio signal. Further, the selected part may be selected to comprise a non-silent passage of the audio signal. Thus, the signature data may be more characteristic and similarities between different signature data may be easier to detect.

An embodiment of the invention may also enable an operation according to a broadcast mode. In broadcast mode, there is no need for a two-directional communication channel between the server and the client. There only need to be a communication channel from the server to the client. This may be helpful, if no back channel from the client to the server is available.

In broadcast mode, the first signature data may be sent from the server to the client, and the step of comparing is done at the client. Further, said reference point in time may be sent from the server to the client, and the step of determining may be done at the client.

Still further, the first signature data may correspond to at least one selected part of the audio signal. The selected part may be selected to comprise a non-silent part of said audio signal. By selecting a non-silent part, the comparison may be easier because the signature data may be more representative and/or characteristic of the at least one part of the audio signal.

In broadcast mode, the second signature data may also comprise a plurality of subunits, wherein each subunit is derived from a respective part of said audio signal, and wherein, in said step of comparing, a similarity measure is determined for each subunit, said similarity measure being descriptive of a degree of similarity of a respective subunit and said first signature data, and wherein, in said step of determining, the point in time may be determined to be equal to the reference point in time of a maximum similar subunit, said maximum similar subunit having the highest similarity measure of all subunits.

In a further embodiment, it is possible that, at said client, a local time is provided, and wherein each subunit is associated with a local point in time, and said step of comparing is only performed for subunits having a local point in time within a predefined time range surrounding said reference point in time. This may be helpful, because at the client, there may be a large number of parts of said audio signal for which second signature data are available. For example, second signature data may be derived every 10 seconds or 30 seconds or any predetermined period of time. The beginning or end times of the respective parts of said audio signal may be associated with a local time of the client. After the client has received the first signature data from the server together with respective corresponding reference points in time, the client may only compare the subunits of said second signature data corresponding to parts having a beginning or end time in the vicinity of the reference point in time.

According to a further embodiment, it may also be possible to perform said step of comparing for only one close subunit. The close subunit is the subunit having the closest local point in time of all subunits to the reference point in time. In other words, the beginning and/or end times of the parts of the audio signal corresponding to the subunits may be compared to the reference points of time of the first signature data and the subunit/audio part is selected that has the closest beginning or end time to the reference point in time.

As already mentioned, the audio signal may be part of a video/audio signal and the method may be performed for determining a point in time within the video/audio signal. Therefore, the audio signal may be extracted from the video/audio signal, and the step of deriving, comparing and determining may be performed for the audio signal.

The method may also comprise sending program information corresponding to the audio signal or television signal from the server to the client, and select at least a part of the audio signal or television signal for playback based on the program information. If the method is applied to a video/audio signal, e.g. a television program, then the program information may correspond to e.g. electronic program (EPG) information indicating the beginning and end times of a broadcast movie. In this case the clients may determine the exact beginning and end times of the movie based on the determined point in time. Because the client has determined the exact starting or end time of a part of said audio signal, it is possible to determine the beginning and/or end times of a movie corresponding to the recorded video/audio signal by calculating respective time differences from the known point in time. According to a further embodiment, it may also be possible that the program information comprises beginning and end times of advertising blocks, e.g. commercials. When reproducing the audio signal or the video/audio signal, it is possible to cut out the advertising by jumping from the beginning to the end time of an advertising block contained in the audio signal or television signal. It is also possible to modify the recorded audio/television signal by deleting parts of the recorded signal that do not belong to a desired part of the signal, e.g. parts that do not belong to a movie.

A recording device may, in one embodiment, comprise a receiving mechanism configured to receive an audio signal from a broadcast station and further configured to receive timing information from a server, and a playback mechanism configured to playback said audio signal depending on said timing information.

The receiving mechanism may further be configured to receive from said server program information related to said audio signal, and further configured to select at least a part of said audio signal for playback based on the program information.

A recording device operating according to the broadcast mode may comprise a receiving mechanism configured to receive an audio signal from a broadcast station and further configured to receive, from a server, first signature data and at least one reference point in time, said first signature data having been derived from said audio signal wherein said first signature data are descriptive of at least one part of said audio signal, and wherein said reference point in time is associated with the beginning or end of said at least one part of said audio signal. The device may further comprise a data processing mechanism configured to derive second signature data from the audio signal, wherein the second signature data are descriptive of at least one part of said audio signal and are derived in the same manner, e.g. according to a same algorithm, as the first signature data, said data processing mechanism being further configured to compare the first and second signature data and to determine a playback start and/or end time depending on the comparison result. The recording device may also comprise a playback mechanism configured to playback the audio signal in accordance with the playback start and/or end time.

FIG. 1 shows a broadcast station 100, client 200 and server 300. Client 200 can e.g. be a recording device such as e.g. a recording device having a hard disc and/or a digital versatile disc (DVD) recorder. Broadcast station 100 sends a television signal TV to client 200 and server 300. The television signal TV comprises an audio signal.

FIG. 1 shows an embodiment of the invention according to the bidirectional mode. Thus, there is a two-directional communication between client 200 and server 300. In bidirectional mode, client 200 selects at least one part of the audio signal and derives second signature data $E_T$. Signature data $E_T$ may be determined according to a predetermined algorithm such as e.g. described in published European Patent Application No. EP 1667106 A1 (=EP Application No. 04 028 88.1).

The second signature data $E_T$ is sent from client 200 to server 300. Alternatively client 200 may also send a part $S_T$ of the audio signal to server 300. In this case, there may be no need to determine signature data and the comparison is directly done based on a part of the audio signal.

Figure 2:
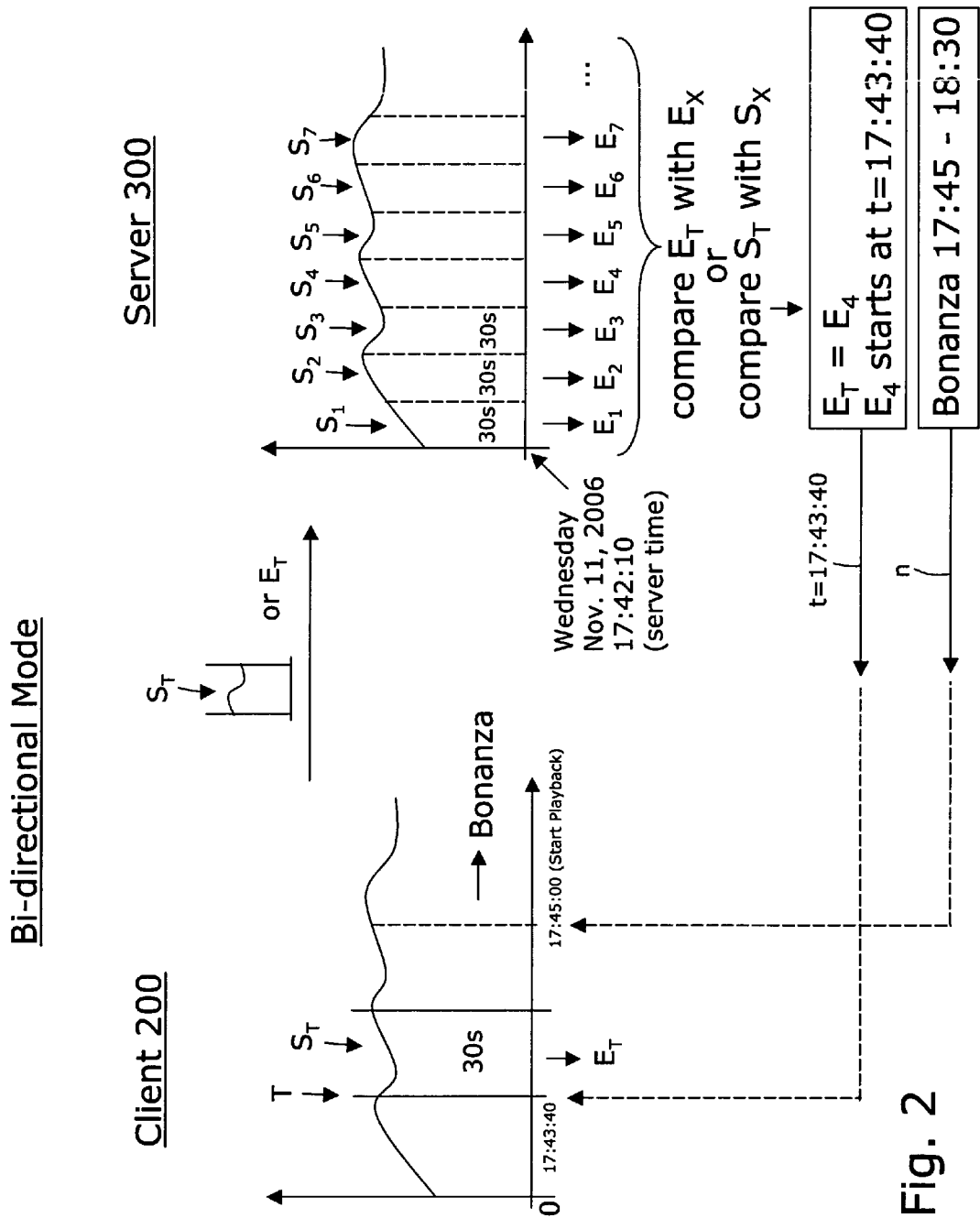
FIG. 2 shows diagrams for explaining the bidirectional mode.

As seen in FIG. 2, Server 300 continuously determines first signature data $E_1, E_2, \ldots$ for parts of said audio signal of predefined length and compares the received second signature data $E_T$ with the derived first signature data $E_1, E_2 \ldots$. If the server determines that one of the first signature data $E_1, E_2, \ldots$ matches with the second signature data $E_T$, the matching signature data $E_X$ is selected and the beginning and/or end time of the corresponding part of the audio signal are determined. Server 300 may comprise a server clock providing a server time that is used for determining the beginning and/or end times of the parts of the audio signal corresponding to the first signature data. The beginning and/or end times of the matching first signature data is then send to the client. For example, in FIG. 1 the beginning time t of the part of the audio signal corresponding to the first signature data matching with second signature data $E_T$ is sent from server 300 to client 200.

Optionally, the server 300 may also transmit program information M, e.g. meta data or the like, to client 200. The program information M may indicate beginning and/or end times of a certain audio program, video program (television program), movie or the like or may also indicate beginning and end times of advertisement blocks. Because, after receiving beginning time t of the part of the audio signal corresponding to second signature data $E_T$, client 200 may determine based on beginning time t the exact location of the beginning and end of a movie, audio program or advertisement block.

FIG. 2 shows an example where the same audio signal has been received at client 200 and server 300. On the left hand side of FIG. 2, the received audio signal at client 200 is shown, and on the right hand side of FIG. 2, the received audio signal at the server 300 is shown.

As seen in FIG. 2, at the client 200, a part $S_T$ of the audio signal is selected. Part $S_T$ may be selected such that the audio signal is essentially non-silent. Part $S_T$ may have a predefined length of e.g. 10 seconds, 20 seconds or 30 seconds or more. For part $S_T$, second signature data $E_T$ are derived according to a predefined algorithm.

In the diagram at the left hand side of FIG. 2, a point in time T is shown corresponding to the beginning of part $S_T$. It is desirable to determine the point in time T. If point in time T is known, then it is possible to navigate through the recorded audio signal and/or video signal at client 200 as described above, e.g. start playback at a desired position or cut out advertisement blocks. In order to determine point in time T, said second signature data $E_T$ is sent to server 300. Alternatively or additionally, part $S_T$ may be sent to server 300.

At server 300, the audio signal received from the broadcast station is segmented into parts $S_1, S_2, \ldots$ of predefined length. The lengths of parts $S_1, S_2, \ldots$ correspond to the length of part $S_T$ at the client 200, for example the length may be chosen to be equal to 30 seconds as shown in the example of FIG. 2.

At the server, the exact time is known, in the following also referred to as server time. The server time may e.g. be determined by a high precision clock or a wireless clock receiving an exact time signal. Thus, at the server, the exact beginning and end times of parts $S_1, S_2, \ldots$ are known. In the example of FIG. 2, part $S_1$ starts e.g. on Wednesday, Nov. 11, 2006 at 17:42:10 hrs. Since each part $S_1, S_2, \ldots$ has a length of 30 seconds, the beginning and end times of each part $S_1, S_2, \ldots$ is known.

Further, at server 300 for each part $S_1, S_2, \ldots$ first signature data $E_1, E_2, \ldots$ is determined in the same manner as said second signature data at client 200.

The received second signature data $E_T$ are compared with the first signature data $E_1, E_2, \ldots$. Alternatively, if the part $S_T$ has been transmitted from client 200 to server 300, part $S_T$ will be compared with each parts $S_1, S_2, \ldots$.

Based on the comparison, it is determined which of the first signature data $E_1, E_2, \ldots$ matches most closely to the second signature data $E_T$. The closest matching first and second signature data is then used to determine point in time T. In the example of FIG. 2, second signature data $E_T$ matches with first signature data E4. Because it is known that part S4 corresponding to first signature data E4 starts at t=17:43:40 hrs, it is determined that the point in time T corresponding to the beginning time of part $S_T$ is at 17:43:40 hrs.

In the example of FIG. 2, the user may want to watch the movie "Bonanza" that was broadcast from 17:45:00 hrs to 18:30:00 hrs. The beginning and end times of the movie "Bonanza", i.e. program information M, may, therefore, be transmitted from server 300 to client 200. Since client 200 knows that the exact time of the beginning of part $S_T$ was at 17:43:40 hrs, client 200 is able to determine the exact starting time within the audio/video signal of the movie "Bonanza".

Figure 3:
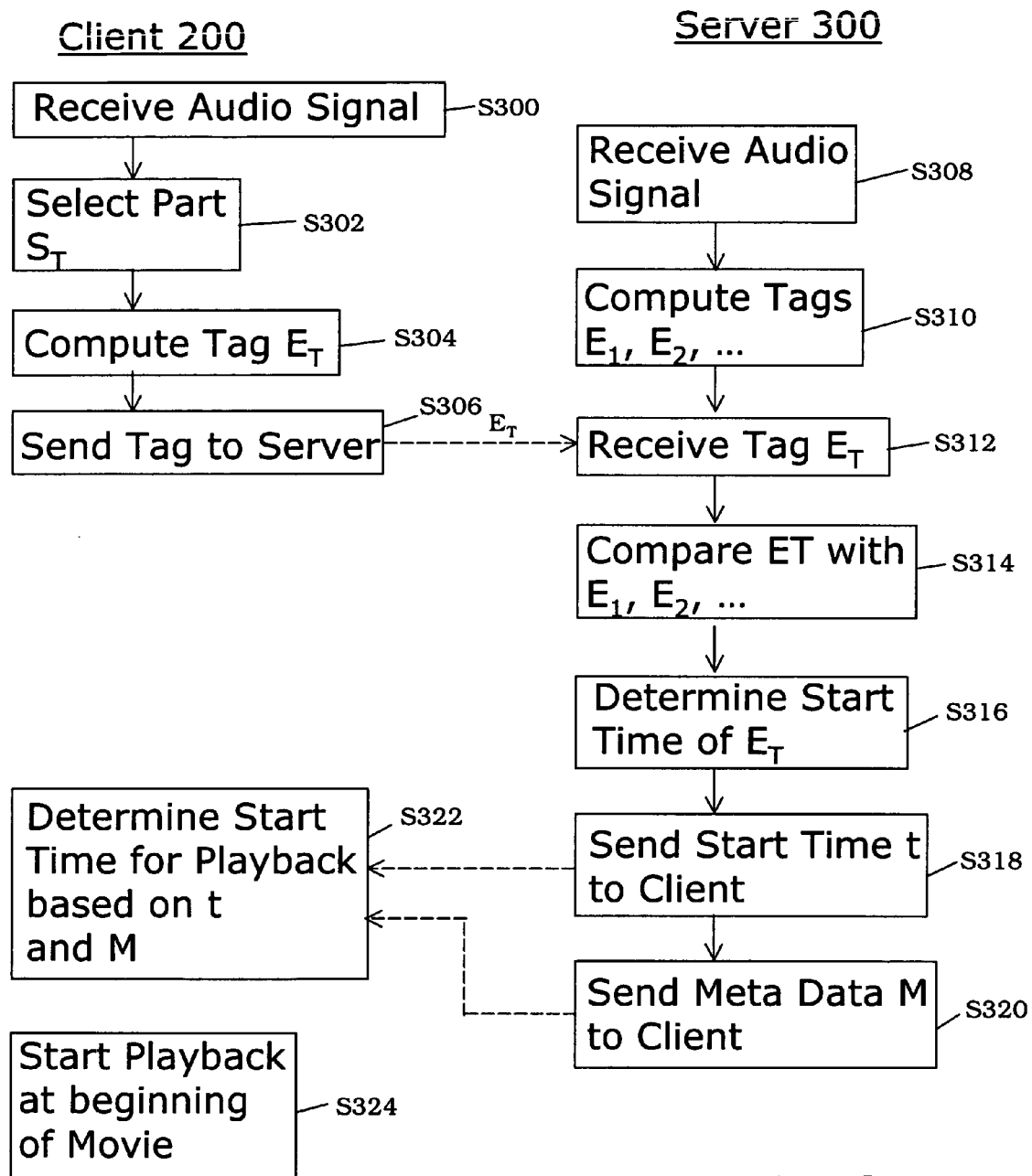
FIG. 3 shows a flowchart explaining the operation according to bidirectional mode.

FIG. 3 shows a flowchart with steps that may be performed for determining a point in time and/or the start time for playback of a desired movie or the like.

On the left hand side of FIG. 3, the steps performed at client 200 are shown, and at the right hand side of FIG. 3 the steps performed at server 300 are shown.

In step S300, at client 200, an audio signal, e.g. of a television signal, is received. In step S302, a part $S_T$ of the audio signal is selected. In step S304, for the selected part $S_T$, second signature data, in the following also referred to as tag or client tag $E_T$ is determined. In step S306 tag $E_T$ is sent to server 300.

As seen on the right hand side of FIG. 3, at server 300, in step S308, the same audio signal is also received. Further, in step S310, tags $E_1, E_2, \ldots$, in the following also referred to as server tags $E_1, E_2, \ldots$ are determined according to the same algorithm/in the same manner as at client 200. In step S312, tag $E_T$ is received from client 200. Further, in step S314, tag $E_T$ is compared with the server tags $E_1, E_2, \ldots$. In step S314 it is determined, which of the server tags $E_1, E_2, \ldots$, corresponds to client tag $E_T$.

Then, in step S316, the start time of the client tag $E_T$ is determined. The start time of client tag $E_T$ corresponds to the start time of the server tag matching most closely to client tag $E_T$. Then, in step S318, the start time t is sent from server 300 to client 200. Further, in step S320, meta data M, e.g. program information or the like, may be transmitted from server 300 to client 200. In step S322, client 200 may determine the start time for playback of a user selected audio program and/or video program, i.e. a desired movie, based on start time t and meta data M.

Then, in step S324 playback starts at the beginning of the desired movie.

Figure 4:
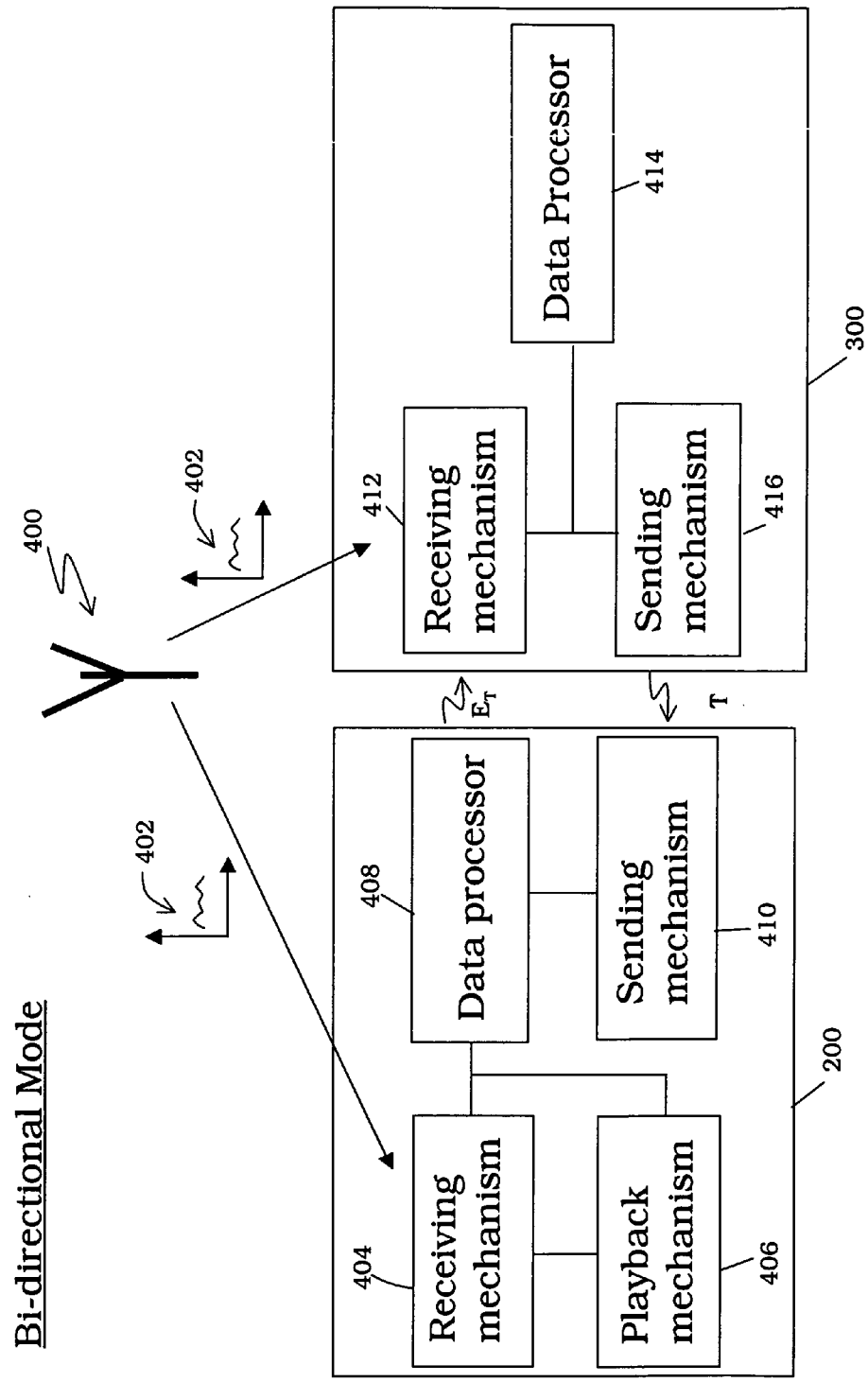
FIG. 4 shows a client and a server, wherein client and server communicate with each other in both directions (bidirectional mode)

FIG. 4 shows a possible embodiment of a client/server architecture.

An audio/video signal 402 is broadcast from a broadcast station 400 to client 200 and server 300. Client 200 may comprise a receiving mechanism 404 configured to receive audiovisual signal 402 and may further be configured to receive timing information T from server 300. Further, client 200 may comprise a playback mechanism configured to playback the audio signal depending on the timing information. Optionally, client 200 may further comprise a data processor 408 configured to derive signature data from the audiovisual signal 402, wherein the signature data are descriptive of at least a part of the audio signal and are derived in a predetermined manner. Further, client 200 may comprise a sending mechanism, configured to sent the signature data $E_T$ to server 300.

Server 300 may comprise a receiving mechanism 412 configured to receive the audio/video signal 402. Further, a server 300 may comprise a data processor 414 configured to derive server tags $E_1, E_2, \ldots$ (cf. FIGS. 2 and 3 above) and compare these tags with the signature data $E_T$.

Server 300 may also comprise a sending mechanism 416 configured to send the timing information T corresponding to the determined beginning time of client tag $E_T$ to client 200.

Figure 5:
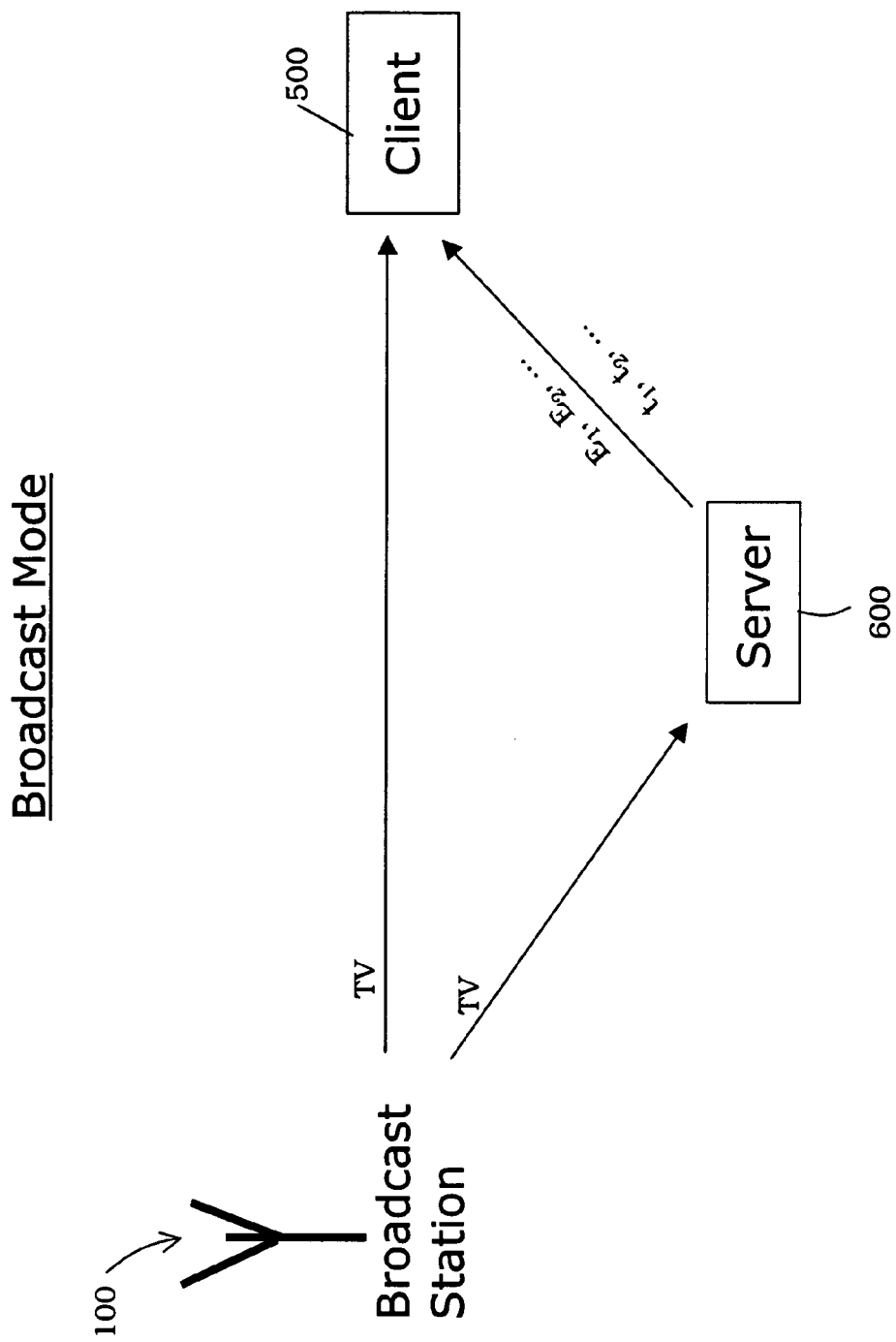
FIG. 5 shows a system overview in case of operation according to broadcast mode.

FIG. 5 shows an embodiment, wherein broadcast station 100 transmits a television signal comprising an audio signal to a client 500 and server 600. Client 500 and server 600 allow operation according to broadcast mode. In broadcast mode, there is only a one directional connection from server 600 to client 500. In other words, in contrary to the bidirectional mode, there is no back connection necessary from client 500 to server 600.

Simply speaking, in broadcast mode, server 600 determines server tags $E_1, E_2, \ldots$ based on the television signal TV and sends the server tags $E_1, E_2, \ldots$ to client 500. Client 500 determines client tags in the same manner, e.g. according to a predetermined same algorithm, as server 600. In order to determine a point in time corresponding to a beginning or end time of one of server tags $E_1, E_2, \ldots$, client 500 compares the determined client tags with the server tags $E_1, E_2, \ldots$. In broadcast mode, server 600 further transmits beginning and/or end times $t_1, t_2, \ldots$ to client 500. Beginning and/or end times $t_1, t_2, \ldots$ correspond to the beginning and/or end times of respective server tags $E_1, E_2, \ldots$.

Thus, client 500 may determine the beginning and/or end time of a client tag by determining the closest matching client tag that matches best with a server tag $E_1, E_2, \ldots$. The beginning and/or end time of the client tag may then be set to the beginning and/or end time t of the respective server tag.

Figure 6:
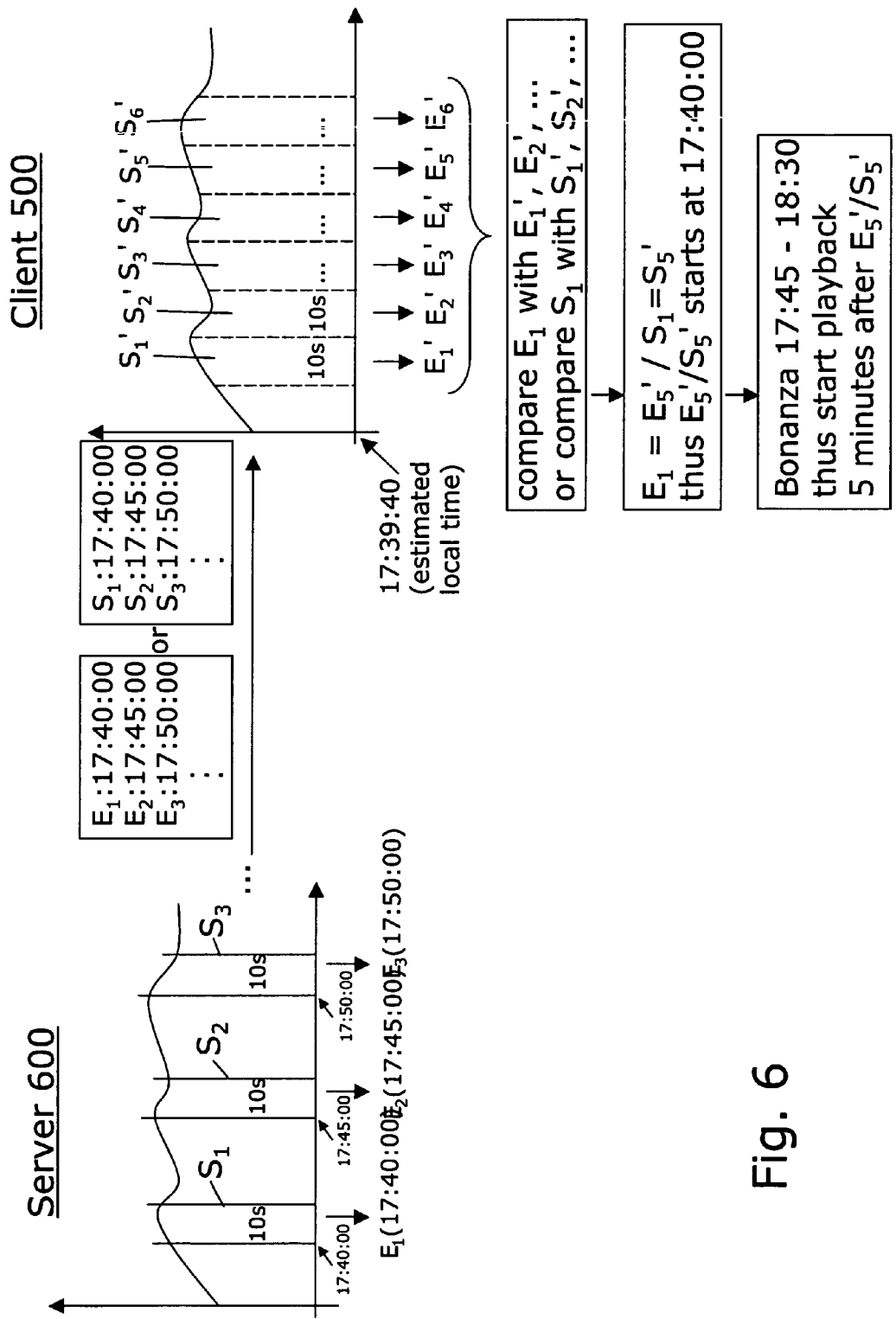
FIG. 6 shows diagrams for explaining the broadcast mode.

On the left hand side of FIG. 6, the audio signal contained in television signal TV is shown. On the right hand side of FIG. 6 the audio signal corresponding to television signal TV having been received and recorded at client 500 is shown.

In broadcast mode, server 600 determines server tags $E_1, E_2, \ldots$. For example, a server tag may be determined every five minutes or every ten minutes. The server tags $E_1, E_2, \ldots$ may correspond to server parts $S_1, S_2, \ldots$ of the audio signal, wherein parts $S_1, S_2, \ldots$ may be of a predetermined length, e.g. 10 seconds, 20 seconds, 30 seconds or more.

It should be noted that although FIG. 6 shows that a plurality of server tags $E_1, E_2, \ldots$ are determined, it may be sufficient to only determine one server tag $E_1$.

The server tags $E_1, E_2, \ldots$ are then transmitted to client 500 together with respective beginning and/or end times. In the example of FIG. 6, the beginning times of the respective parts $S_1, S_2, \ldots$ corresponding to server tags $E_1, E_2, \ldots$ are transmitted to client 500.

In an alternative embodiment, or in addition to the server tags $E_1, E_2, \ldots$, parts $S_1, S_2, \ldots$ may be transmitted from server 600 to client 500.

At client 500, as shown on the right hand side of FIG. 6, client tags $E_1', E_2', \ldots$ are determined e.g. every 10 seconds. It is also possible that client tags $E_1', E_2'$ be determined only every minute or so. In this case the client tags may need to be longer than 30 seconds. The client parts $S_1', S_2'$ corresponding to client tags $E_1', E_2', \ldots$ may have a predetermined length that may be the same as the length of server parts $S_1, S_2, \ldots$.

The server tags $E_1, E_2, \ldots$ are compared with client tags $E_1', E_2', \ldots$.

In order to save computational time, it is possible that a certain server tag be chosen for the comparison. The certain server tag may be determined based on an estimated local time at client 500. For example, in FIG. 6 it is estimated that the beginning of client part $S_1'$ corresponding to client tag $E_1'$ starts at local time 17:39:40 hrs. The server tag of server tags $E_1, E_2, \ldots$ having the closest beginning time to this estimated local time 17:39:40 hrs is server tag $E_1$ that started at server time 17:40:00 hrs. Therefore, the server tag $E_1$ will be compared to client tags $E_1', E_2', \ldots$. Thus, computational burden may be reduced since the number of needed comparisons is reduced. No exhaustive search may be necessary and server tag $E_1$ need only be compared to client tags $E_1', E_2', \ldots$. It is thus not necessary that all server tags $E_1, E_2, \ldots$ be compared with all client tags $E_1', E_2', \ldots$.

In a further embodiment, it may also be possible to reduce the needed computational time by only comparing client tags to a certain server tag, which client tags are in the vicinity of the starting time of the server tag. In the vicinity means e.g. within a predetermined time range of the beginning time of the respective server tag.

In an embodiment, where server parts $S_1, S_2, \ldots$ are transmitted from server 600 to client 500, server parts $S_1, S_2, \ldots$ may be compared to client parts $S_1', S_2', \ldots$. In an analogous way as when using tags, it is possible to reduce the computational burden by only comparing a selected server part to client parts $S_1', S_2'$ having a close beginning time as that of the server part.

In the example of FIG. 6, it is determined that server tag $E_1$ matches most closely with client tag $E_5'$. Thus, it is determined that client part $S_5'$ corresponding to client tag $E_5'$ starts at the same time as server tag $E_1$, i.e. at 17:40:00 hrs.

In a further embodiment, it is possible that program information M be transmitted from server 600 to client 500, which program information M indicates e.g. beginning and/or end times of an audio program, a movie, advertisement and so on. In the example of FIG. 6, the program information M indicates that movie "Bonanza" was broadcast from 17:45:00 hrs to 18:30:00 hrs. Thus, client 500 may start playback five minutes after the start of client part $S_5'$ having a beginning time at 17:40:00 hrs.

Figure 7:
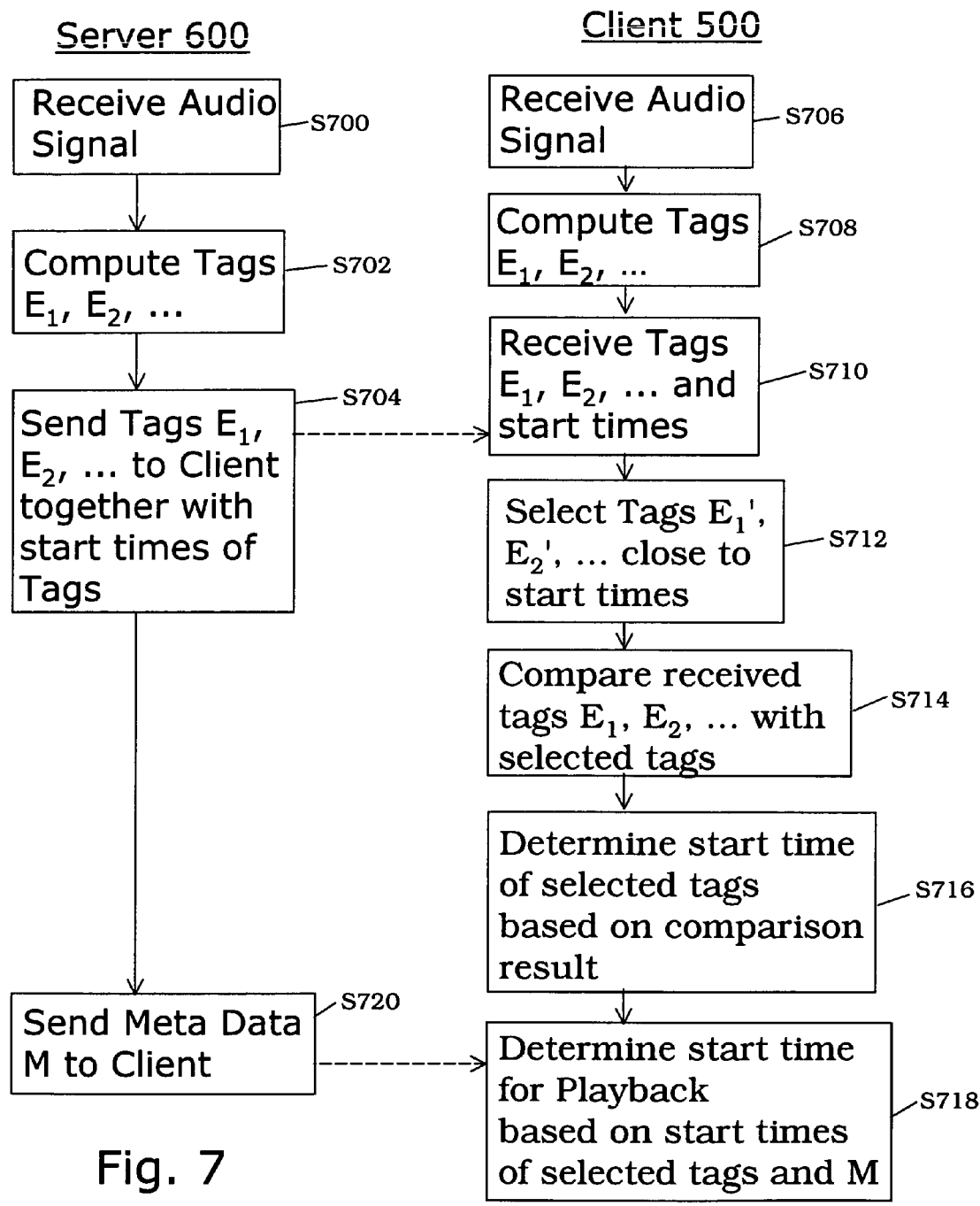
FIG. 7 shows a flowchart for explaining steps according to the broadcast mode.

FIG. 7 shows steps that may be performed at server 600 and client 500 in broadcast mode.

In step S700, at server 600, the audio signal of the television signal is received. Further, in step S702 server tags $E_1, E_2, \ldots$ are determined as explained in connection with left hand side of FIG. 6. Further, in step S704 server tags $E_1', E_2', \ldots$ are sent to client 500 together with respective beginning times of the tags.

At client 500, in step S706, the audio signal of the television signal that was broadcast by the broadcast station 100 is received. Further, in step S708 client tags $E_1', E_2', \ldots$ are determined as explained at hand of right hand side of FIG. 6. Then, in step S710 server tags $E_1, E_2, \ldots$ and corresponding beginning times are received from server 600.

Then, in step S712, certain client tags $E_1', E_2', \ldots$ are selected that are close to the start times of respective server tags $E_1, E_2, \ldots$. Of course, it is also possible as explained in connection with right hand side of FIG. 6 to select only one server tag (in the example of FIG. 6 server tag $E_1$) that will be used for the comparison.

Then, in step S714, server tags $E_1, E_2, \ldots$ are compared with selected client tags $E_1', E_2'$.

In step S716 the beginning times of the selected client tags or at least one beginning time of one closest matching client tag is determined based on the comparison result.

In step S720 performed at server 600, meta data M is sent from server 600 to client 500.

In step S718, at client 500, the start time for playback is determined based on the beginning time of the closest matching client tag and meta data M.

The following elucidations may help to get a better understanding:

According to an embodiment of the invention, a client device, e.g. a recording device, may determine a tag from a received video signal. The tag may be sent to the server, which determines at which time and in which channel the program was shown. This information is sent to the client. Thus, an exact allocation of a recorded video signal to a television program may be achieved. Due to this exact allocation, it may be possible to offer services such as exact navigation, e.g. cutting out advertisement or navigating to a certain scene within a movie.

The services may be offered as a sort of service business which sells services to its clients or as add on business to hardware manufacturers, who want to add features to their recording devices.

In all cases, it is assumed that there is a central data base (a supplier of meta data), e.g. a server, which has relevant information for the television consumer. This could, e.g. be the location of commercials or advertisements, but it could also be information about what actor appears when in the movie, transcript information for the hearing impaired, bilingual subtitles or other. In the easiest case, it might just be the exact starting and ending time of the current program. All of this additional information may also be referred to as program information or meta data.

If the information is just the exact starting and ending time of a current program, the additional functionality offered may be the automatic and second-split exact cutting of the recording.

In more advanced examples, there could be subtitles appearing synchronized to any movie (e.g. as service for learners of foreign languages) or their could be direct navigation to locations where a certain actor speaks or sings, etc. By marking commercials, it is possible to replace commercials by targeted advertising: the commercial slot in the original recording may be filled with any other commercial completely transparent to the user.

There may be two modes: (basic) bidirectional mode, and broadcast mode.

In bidirectional mode, first, the user does his recording, say from 17:55:00 hrs to 19:05:00 hrs because he wants to record a movie running from 18:00:00 hrs to 19:00:00 hrs. Then, the recording device takes out an audio snippet, i.e. a part of the audio signal, from the recording, properly selected, and sends this to the server. "Properly selected" may mean that a descriptive piece of audio is selected, and not a piece of audio which makes the unique identification, e.g. based on signature data, hard. For example, it may be that silent passages are avoided.

The server uses the snippet or a tag to identify the exact location in the audio stream where the snippet was taken from. The server then computes from its data base, the information, when the exact starting and ending time of the snippet were, relative to the snippet, e.g. "this is "Desperate Housewives, episode 233, it starts 2 minutes 34 seconds before that snippet was taken and it ends 42 minutes, 28 seconds after that snippet was taken".

The client device then may use this timing information to cut out the episode of "Desperate Housewives" at exactly the correct beginning and end times. Of course, the server may also transmit additional data, like actor information, series information, and the like; and all of this would be stored together with the episode of "Desperate Housewives". If information about the were-about of the commercials would be transmitted, this would immediately allow to block all commercials during playback, either by skipping them during playback, or by removing them from the client device altogether.

In broadcast mode, it may be possible to get rid of the back connection from the client to the server. In broadcast mode, the server samples each of the supported TV program streams in regular intervals, e.g. every 5 minutes for 10 seconds or so, and computes fingerprints, i.e. tags of the sampled sections. The server then may downstream all the relevant meta data information to the client together with all the fingerprints. The client locally runs the fingerprinting in "server mode", searching for each of the fingerprints in the current recording. Of course, an exhaustive search is not required since the client knows the rough time of recording and the channel and can therefore reduce the number of potential fingerprints to one to three. Once the fingerprint is located in the local recording, the exact alignment and further meta data usage can be started in the same fashion as in the case of bidirectional mode.

The invention claimed is:

1. A method of operating a server and a client, wherein a point in time within an audio signal is determined, said audio signal having been transmitted from a broadcast station to said client and to said server, the method comprising:
    deriving, at the server, first signature data from said audio signal, wherein said first signature data are descriptive of at least one part of said audio signal, and wherein a reference point in time is associated with the beginning or end of said at least one part of said audio signal;
    deriving, at the client, second signature data from said audio signal, wherein said second signature data are descriptive of at least one part of said audio signal and are derived in the same manner as said first signature data at the server;
    comparing said first and second signature data;
    determining said point in time to be equal to said reference point in time depending on a result of said comparing,
    wherein said second signature data comprise a plurality of sub-units, wherein each sub-unit is derived from a part of said audio signal, and wherein, in said comparing, a similarity measure is determined for each sub-unit, said similarity measure being descriptive of a degree of similarity of a sub-unit and said first signature data.

2. A method of operating a server and a client, wherein a point in time within an audio signal is determined, said audio signal having been transmitted from a broadcast station to said client and to said server, the method comprising:
    deriving, at the server, first signature data from said audio signal, wherein said first signature data are descriptive of at least one part of said audio signal, and wherein a reference point in time is associated with the beginning or end of said at least one part of said audio signal;

deriving, at the client, second signature data from said audio signal, wherein said second signature data are descriptive of at least one part of said audio signal and are derived in the same manner as said first signature data at the server;

comparing said first and second signature data;

determining said point in time to be equal to said reference point in time depending on a result of said comparing, wherein said first signature data comprise a plurality of sub-units, wherein each sub-unit is derived from a part of said audio signal, and wherein, in said comparing, a similarity measure is determined for each sub-unit, said similarity measure being descriptive of a degree of similarity of a sub-unit and said second signature data.

3. The method according to claim 2, wherein said second signature data are sent from said client to said server, and said comparing is done at the server.

4. The method according to claim 3, wherein said reference point in time is sent from said server to said client, and said determining is done at the server.

5. The method according to claim 2, wherein said second signature data correspond to only one selected part of said audio signal.

6. The method according to claim 2, wherein, in said determining, the point in time is determined to be equal to the reference point in time of a maximum similar sub-unit, said maximum similar sub-unit having the highest similarity measure of all sub-units.

7. The method according to claim 2, wherein said parts of said audio signal from which said sub-units are derived, are selected to comprise non-silent passages of said audio signal.

8. The method according to claim 2 or 1, wherein said first signature data are sent from said server to said client, and said comparing is done at the client.

9. The method according to claim 8, wherein said reference point in time is sent from said server to said client, and said determining is done at the client.

10. The method according to claim 8, wherein said first signature data correspond to at least one selected part of said audio signal.

11. The method according to claim 8, wherein said first signature data correspond to a plurality of selected parts of said audio signal.

12. The method according to claim 10, wherein said selected part is selected to comprise a non-silent part of said audio signal.

13. The method according to claim 1, wherein, in said determining, the point in time is determined to be equal to the reference point in time of a maximum similar sub-unit, said maximum similar sub-unit have the highest similarity measure of all sub-units.

14. The method according to claim 13, wherein, at said client, a local time is provided, and wherein each sub-unit is associated with a local point in time, and wherein said comparing is only performed for sub-units having a local point in time within a pre-defined time range surrounding said reference point in time.

15. The method according to claim 13, wherein, at said client, a local time is provided, and wherein each sub-unit is associated with a local point in time, and wherein said comparing is only performed for a close sub-unit, said close sub-unit having the closest local, point in time to said reference point in time of all sub-units.

16. The method according to claim 2 or 1, wherein said audio signal is part of a television signal and said method is a method for determining a point in time within said television signal.

17. The method according to claim 16, wherein, at said client, said television signal is recorded and said point in time is used to control playback of the recorded television signal.

18. The method according to claim 2 or 1, further comprising:

sending program information corresponding to said audio signal from said server to said client;

selecting at least a part of said audio signal for playback based on said program information.

19. The method according to claim 18, wherein said program information comprises at least one beginning time and corresponding end time, said beginning and end time indicating a part of said audio signal to be selected for playback or said beginning and end time indicating a part of said audio signal not to be selected for playback.

20. The method according to claim 19, wherein said beginning and end times correspond to beginning and end times of a piece of music and/or a movie.

21. The method according to claim 2 or 1, wherein said at least one part of said audio signal from which said first and second signature data are derived, has a predefined length.

22. A non-transitory computer readable storage medium including computer readable program codes embodied in the computer readable storage medium that, when executed cause a computer to execute a method for determining a point in time within an audio signal, said audio signal having been transmitted from a broadcast station to a client and to a server, said method comprising:

deriving, at the server, first signature data from said audio signal, wherein said first signature data are descriptive of at least one part of said audio signal, and wherein a reference point in time is associated with the beginning or end of said at least one part of said audio signal;

deriving, at the client, second signature data from said audio signal, wherein said second signature data are descriptive of at least one part of said audio signal and are derived in the same manner as said first signature data at the server;

comparing said first and second signature data;

determining said point in time to be equal to said reference point in time depending on a result of said comparing, wherein said first signature data comprise a plurality of sub units, wherein each sub-unit is derived from a part of said audio signal, and wherein, in said comparing, a similarity measure is determined for each sub-unit, said similarity measure being descriptive of a degree of similarity of a sub-unit and said second signature data.

23. A recording device, comprising a receiving mechanism configured to receive an audio signal from a broadcast station and further configured to receive, from a server, first signature data and at least one reference point in time, said first signature data having been derived from said audio signal, wherein said first signature data are descriptive of at least one part of said audio signal, and wherein said reference point in time is associated with the beginning or end of said at least one part of said audio signal:

a data processing mechanism configured to derive second signature data from said audio signal, wherein said second signature data are descriptive of at least one part of said audio signal and are derived in the same manner as said first signature data, said data processing mechanism being further configured to compare said first and second signature data and to determine a playback start and/or end time depending on the comparison result;

a playback mechanism configured to playback said audio signal depending on said playback start and/or end time, wherein said second signature data comprise a plurality of sub-units, wherein each sub-unit is derived from a part of said audio signal, and wherein, in said comparing, a similarity measure is determined for each sub-unit, said similarity measure being descriptive of a degree of similarity of a sub-unit and said first signature data.

24. The recording device according to claim 23, wherein said receiving mechanism is further configured to receive, from said server, program information related to said audio signal, and to select at least a part of said audio signal for playback based on said program information.

25. The recording device according to claim 24, wherein said program information comprises at least one beginning time and corresponding end time, said beginning and end time indicating a part of said audio signal to be selected for playback or said beginning and end time indicating a part of said audio signal not to be selected for playback.

26. The recording device according to claim 23, wherein said audio signal is part of a video/audio signal.

27. A system for recording and reproducing audio/video signals, the system comprising:
a recording device according to claim 23; and
a server configured to provide said first signature data and said at least one reference point in time.

28. A method of operating a server and a client, wherein a point in time within a television signal is determined, said television signal having been transmitted from a broadcast station to said client and to said server, the method comprising:
deriving, at the server, first signature data from said television signal, wherein said first signature data are descriptive of at least one part of said television signal, and wherein a reference point in time is associated with the beginning or end of said at least one part of said television signal, wherein said first signature data comprise a plurality of sub-units, wherein each sub-unit is derived from a part of said television signal, and wherein, in said comparing, a similarity measure is determined for each sub-unit, said similarity measure being descriptive of a degree of similarity of a sub-unit and said second signature data;
deriving, at the client, second, signature data from said television signal, wherein said second signature data are descriptive of at least one part of said television signal and are derived in the same manner as said first signature data at the server;
comparing said first and second signature data;
determining said point in time to be equal to said reference point in time depending on a result of said comparing.

29. A method for determining a point in time within a television signal, comprising:
deriving, at a server, first signature data from said television signal, wherein a reference point in time is associated with the beginning or end of said first signature data;
deriving, at a client, second signature data from said television signal, wherein said second signature data are derived in the same manner as said first signature data at the server, wherein said second signature data comprise a plurality of sub-units, wherein each sub-unit is derived from a part of said television signal, and wherein, in said comparing, a similarity measure is determined for each sub-unit, said similarity measure being descriptive of a degree of similarity of a sub-unit and said first signature data;
comparing said first and second signature data;
determining said point in time to be equal to said reference point in time depending on a result of said comparing.

30. The method according to claim 29, wherein, at said client, said television signal is recorded and said point in time is used to control playback of the recorded television signal.

31. A non-transitory computer readable storage medium having computer readable program codes embodied in the computer readable storage medium that, when executed cause a computer to execute a method for determining a point in time within an audio signal, said audio signal having been transmitted from a broadcast station to a client and to a server, said method comprising:
deriving, at the server, first signature data from said audio signal, wherein said first signature data are descriptive of at least one part of said audio signal, and wherein a reference point in time is associated with the beginning or end of said at least one part of said audio signal;
deriving, at the client, second signature data from said audio signal, wherein said second signature data are descriptive of at least one part of said audio signal and are derived in the same manner as said first signature data at the server;
comparing said first and second signature data;
determining said point in time to be equal to said reference point in time depending on a result of said comparing,
wherein said second signature data comprise a plurality of sub-units, wherein each sub-unit is derived from a part of said audio signal, and wherein, in said comparing, a similarity measure is determined for each sub-unit, said similarity measure being descriptive of a degree of similarity of a sub-unit and said first signature data.

* * * * *